US008598746B2

(12) United States Patent
Kim et al.

(10) Patent No.: US 8,598,746 B2
(45) Date of Patent: Dec. 3, 2013

(54) RESONANCE POWER GENERATOR AND METHOD, AND RESONANCE POWER RECEIVER AND METHOD

(75) Inventors: Nam Yun Kim, Seoul (KR); Young Tack Hong, Seongnam-si (KR); Sang Wook Kwon, Seongnam-si (KR); Eun Seok Park, Suwon-si (KR); Young Ho Ryu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 408 days.

(21) Appl. No.: 12/967,609

(22) Filed: Dec. 14, 2010

(65) Prior Publication Data
US 2011/0140542 A1 Jun. 16, 2011

(30) Foreign Application Priority Data
Dec. 14, 2009 (KR) .......................... 10-2009-0124274

(51) Int. Cl.
*H01F 27/42* (2006.01)
(52) U.S. Cl.
USPC .......................................................... 307/104
(58) Field of Classification Search
USPC ................. 307/104, 140, 149; 323/355–366
See application file for complete search history.

(56) References Cited

U.S. PATENT DOCUMENTS

| 5,267,138 | A  | * | 11/1993 | Shores ............................. 363/98 |
| 7,190,091 | B1 | * | 3/2007  | Marshall ......................... 307/26 |
| 8,111,042 | B2 | * | 2/2012  | Bennett ........................ 320/108 |
| 2003/0011486 | A1 | * | 1/2003 | Ying ........................ 340/825.69 |
| 2004/0124741 | A1 |   | 7/2004 | Morrison et al. |
| 2008/0067874 | A1 |   | 3/2008 | Tseng |
| 2010/0109561 | A1 | * | 5/2010 | Chen et al. .................... 315/294 |

FOREIGN PATENT DOCUMENTS

| JP | 2009-088770 | 4/2009 |
| KR | 10-2005-0013605 | 2/2005 |
| KR | 10-2006-0108863 | 10/2006 |
| KR | 10-0806298 | 2/2008 |

* cited by examiner

*Primary Examiner* — Jared Fureman
*Assistant Examiner* — Duc M Pham
(74) *Attorney, Agent, or Firm* — NSIP Law

(57) ABSTRACT

Provided is a resonance power generator and a resonance power receiver, and methods thereof. The resonance power generator may include a frequency generator to receive a direct current (DC) voltage, and to generate a power carrier signal, a high voltage matching transformer to be adjusted to enable an output voltage to be greater than an input voltage, a high current matching transformer to be adjusted to enable an output current to be greater than an input current, a switching unit to switch between the high voltage matching transformer and the high current matching transformer, a control unit to control the switching unit in accordance with an input signal, and a power resonator to transmit a power to a target resonator.

18 Claims, 6 Drawing Sheets

RESONANCE POWER GENERATOR AND METHOD, AND RESONANCE POWER RECEIVER AND METHOD

CROSS-REFERENCE TO RELATED APPLICATION(S)

This application claims the benefit under 35 U.S.C. §119 (a) of Korean Patent Application No. 10-2009-0124274, filed on Dec. 14, 2009, in the Korean Intellectual Property Office, the entire disclosure of which is incorporated herein by reference for all purposes.

BACKGROUND

1. Field

The following description relates to a resonance power generator and a resonance power receiver, and more particularly, to a resonance power generator and a resonance power receiver which may switch between a high voltage power and a high current power, and transmit the switched power.

2. Description of Related Art

Along with development in Information Technology (IT), various portable electronic equipment has been commercialized, and increasingly propagated. Due to characteristics of the portable electronic equipment, a battery performance of a corresponding portable electronic equipment has emerged as an important issue. Even in household electronic equipment, as well as the portable electronic equipments, a function of transmitting data in a wireless manner may be provided, however, power may be provided through a power line.

Recently, research for a wireless power transmission technology transmitting power in a wireless manner has been conducted. Particularly, a typical resonance power generator may use a Radio Frequency (RF) power amplifier to boost power transmitted in a wireless manner through a power resonator. The typical resonance power generator may insert an isolator in an end of the RF power amplifier for the purpose of isolation between a resonator and the RF power amplifier. When the isolator is inserted, an insertion loss may occur.

As power is determined by a magnitude of a voltage and a current, when it is assumed that a total amount of transmission power has a uniform value, a power signal (high voltage power) of which a voltage is dominant, or a power signal (high current power) of which the current is dominant, may exist. When the total amount of the transmission power transmitted from the resonance power generator has a uniform value, a corresponding application example may differ depending on whether a corresponding power signal is the high voltage power or the high current power.

Accordingly, there is a desire for a resonance power generator that may switch between the high voltage power and the high current power, and transmit the switched power, and a resonance power receiver linked with the resonance power generator.

SUMMARY

In one general aspect, there is provided a resonance power generator, including: a frequency generator configured to: receive a direct current (DC) voltage, and generate a power carrier signal, a high voltage matching transformer configured to be adjusted to enable an output voltage to be greater than an input voltage, a high current matching transformer configured to be adjusted to enable an output current to be greater than an input current, a switching unit configured to switch between the high voltage matching transformer and the high current matching transformer, a control unit configured to control the switching unit in accordance with an input signal, and a power resonator configured to transmit a power to a target resonator.

The resonance power generator may further include an alternating current/direct current (AC/DC) converter configured to: receive an alternating current (AC) voltage, and convert the received AC voltage to the DC voltage.

In the resonance power generator, the high voltage matching transformer may be further configured to be adjusted to enable a winding ratio of a second winding side to be greater than a winding ratio of a first winding side.

In the resonance power generator, the high current matching transformer may be further configured to be adjusted to enable a winding ratio of a first winding side to be greater than a winding ratio of a second winding side.

In the resonance power generator, one of the high voltage matching transformer and the high current matching transformer may include a transformer for which a resistance value of a load of an output is adjusted.

In the resonance power generator, the input signal may include a user input signal.

In the resonance power generator, the input signal may include a signal fed back from the target resonator.

The resonance power generator may further include a power amplifier to amplify a power of the power carrier signal.

In another general aspect, there is provided a resonance power receiver, including: a target resonator configured to receive a power transmitted from a power resonator, a rectifier configured to rectify the power into a direct current (DC) signal, a sensing unit configured to: receive the DC signal, and sense a high current power and a high voltage power, an alternating current/direct current (AC/DC) conversion unit configured to convert each of the high current power and the high voltage power into a DC voltage, and a control unit configured to feed back, to the power resonator, high voltage power information or high current power information.

In another general aspect, there is provided a method for a resonance power generator, the method including: receiving a direct current (DC) voltage, generating a power carrier signal, adjusting a high voltage matching transformer to enable an output voltage to be greater than an input voltage, adjusting a high current matching transformer to enable an output current to be greater than an input current, switching between the high voltage matching transformer and the high current matching transformer, controlling the switching in accordance with an input signal, and transmitting a power to a target resonator.

The method may further include: receiving an alternating current (AC) voltage, and converting the received AC voltage to the DC voltage.

The method may further include adjusting the high voltage matching transformer to enable a winding ratio of a second winding side to be greater than a winding ratio of a first winding side.

The method may further include adjusting the high current matching transformer to enable a winding ratio of a first winding side to be greater than a winding ratio of a second winding side.

In the method, one of the high voltage matching transformer and the high current matching transformer may include a transformer for which a resistance value of a load of an output is adjusted.

In the method, the input signal may include a user input signal.

In the method, the input signal may include a signal fed back from the target resonator.

The method may further include amplifying a power of the power carrier signal.

In another general aspect, there is provided a method for a resonance power receiver, the method including: receiving a power transmitted from a power resonator, rectifying the power into a direct current (DC) signal, receiving the DC signal, sensing a high current power and a high voltage power, converting each of the high current power and the high voltage power into a DC voltage, and feeding back, to the power resonator, high voltage power information or high current power information.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1:
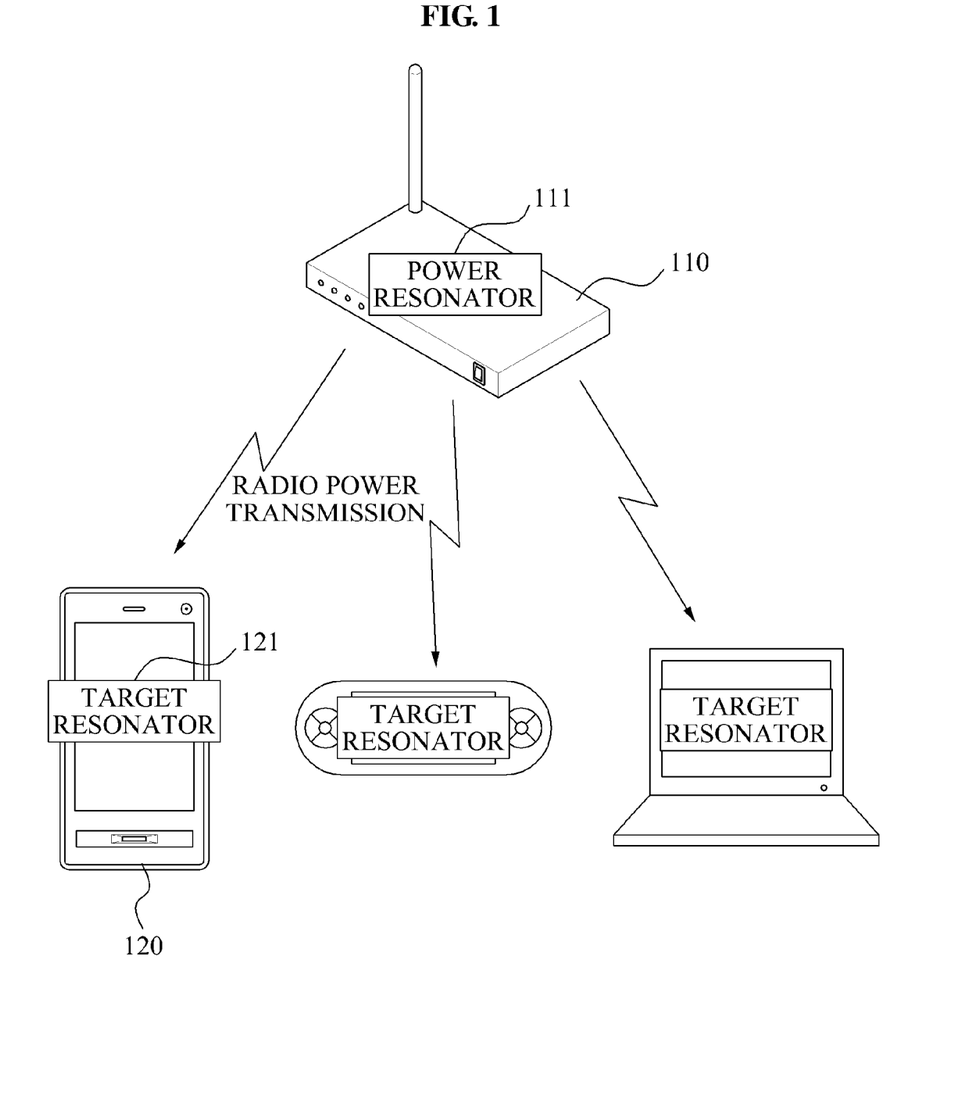
FIG. 1 is a diagram illustrating an environment in which a resonance power generator is applied according to an embodiment.

FIG. 1 is a diagram illustrating an environment in which a resonance power generator 120 may be applied according to an embodiment.

Referring to FIG. 1, the resonance power generator 110 may transmit a power to a resonance power receiver 120 in a wireless manner. The resonance power generator 110 may include a power resonator 111, and the resonance power receiver 120 may include a target resonator 121. The resonance power generator 110 may be implemented to be inserted in a portable terminal as a single module, although embodiments are not limited thereto.

Figure 2:
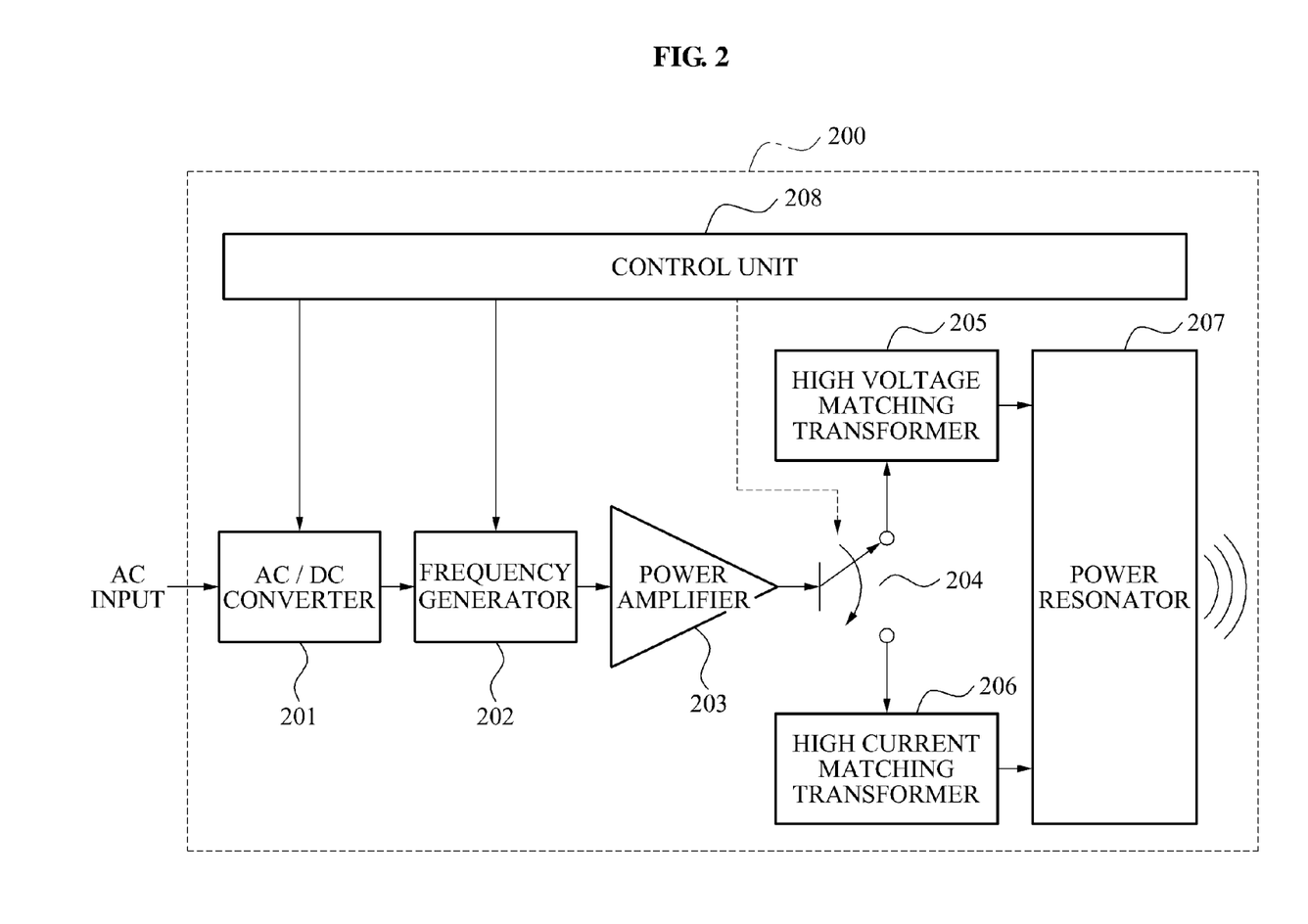
FIG. 2 is a diagram illustrating a configuration of a resonance power generator according to an embodiment.

FIG. 2 is a diagram illustrating a configuration of a resonance power generator 200 according to an embodiment.

The resonance power generator 200 may include a frequency generator 202, a switching unit 204, a high voltage matching transformer 205, a high current matching transformer 206, a power resonator 207, and a control unit 208. Also, as illustrated in FIG. 2, the resonance power generator 200 may further include an Alternating Current/Direct Current (AC/DC) converter 201 converting an inputted alternating current (AC) voltage to a direct current (DC) voltage, or a power amplifier 203.

The AC/DC converter 201 may convert an input power (for example, AC 85 V to 256 V) to a DC voltage.

The frequency generator 202 may receive an output DC voltage of the AC/DC converter 201, and generate a power carrier signal.

The power amplifier 203 may amplify a power of the power carrier signal. According to another embodiment, the power amplifier 203 may be replaced with one of a high voltage matching transformer 205 and a high current matching transformer 206. For example, the high voltage matching transformer 205 and the high current matching transformer 206 may be designed to act as an amplifier; according to an embodiment, the power amplifier 203 may be omitted.

The switching unit 204 may switch between the high voltage matching transformer 205 and the high current matching transformer 206 based on a control of the control unit 208. The control unit 208 controlling the switching unit 204 may control the switching unit 204 based on a signal fed back from a target resonator that receives a resonance power from the resonance power generator 200 or from a user's input signal.

For example, the target resonator may feed back high voltage power information or high current power information to the resonance power generator 200.

Also, the target resonator may detect required current and voltage values of a load, and then feed back the detected values to the resonance power generator 200, which will be further described with reference to an example of a resonance power receiver 300 including a target resonator of FIG. 3.

Figure 3:
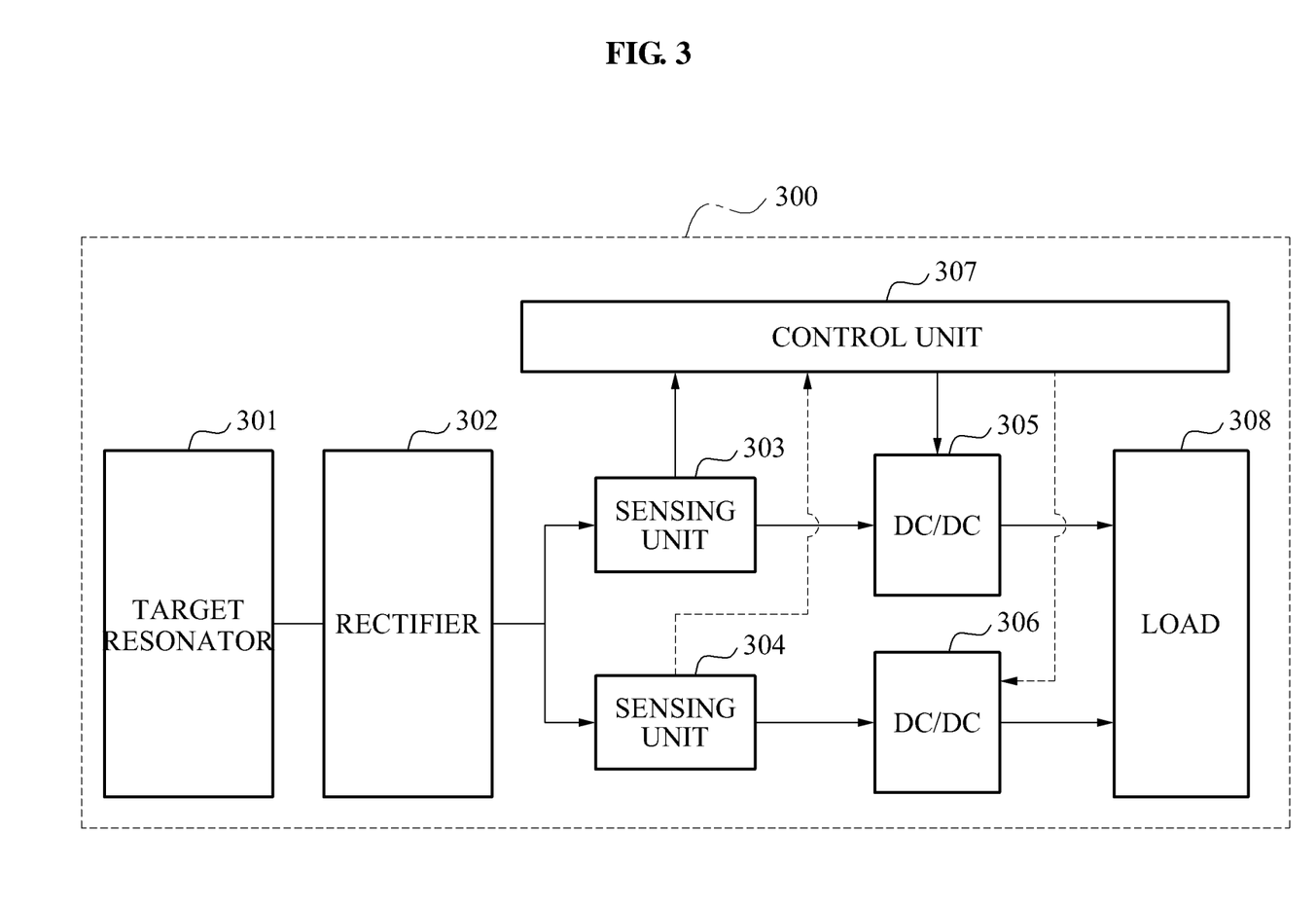
FIG. 3 is a diagram illustrating a configuration of a resonance power receiver according to an embodiment.

FIG. 3 is a diagram illustrating a configuration of a resonance power receiver 300 according to an embodiment. Referring to FIG. 3, the resonance power receiver 300 may include a target resonator 301, a rectifier 302, sensing units 303 and 304, AC/DC converters 305 and 306, and a control unit 307. A load 308 may be positioned inside the resonance power receiver 300, or positioned outside the resonance power receiver 300 when an external load is connected with the resonance power receiver 300.

The target resonator 301 may receive a power transmitted from the power resonator 207 of FIG. 2. The received power may be rectified in the rectifier 302 to be converted to a DC voltage. The received power converted to the DC voltage may be inputted to the sensing units 303 and 304. The sensing units 303 and 304 may sense whether a type of a power required in the load 308 is the high voltage power or the high current power.

The AC/DC conversion unit 305 and 306 may convert the high current power or the high voltage power from an AC voltage to a DC voltage. The converted DC signal may be inputted to the load 308.

The control unit 307 may control the resonance power receiver 300, may determine whether the type of the power required in the load 308 is the high voltage power or the high current power, and may feed back high voltage power information or high current power information to the resonance power generator 200.

Referring again to FIG. 2, the control unit 208 of FIG. 2 may control the switching unit 204 using a input signal including the high voltage power information or the high current power information which is fed back from the resonance power receiver 300, and may transmit a desired type of the power for the resonance power receiver 200 through a control of the switching unit 204. According to another aspect, the input signal may be a user input signal manually inputted by the user.

The high voltage matching transformer 205 may be designed to enable an output voltage to be greater than an input voltage. Furthermore, in embodiments, the high current matching transformer 206 may be designed to enable an output current to be greater than an input current. The high voltage matching transformer 205 and the high current matching transformer 206 may be designed as described below. The above described implementation example of the high voltage matching transformer 205 and the high current matching transformer 206 may be merely an example, and the present embodiment is not limited thereto.

(1) Winding Ratio Adjustment Scheme

The high voltage matching transformer 205 and the high current matching transformer 206 may be designed in a winding ratio adjustment scheme.

For example, the high voltage matching transformer 205 may be configured of a first winding and a second winding, and may be implemented so that an output voltage is greater than an input voltage by adjusting a winding ratio between the first winding and the second winding. Presuming that a number of the first windings is M, and a number of the second windings is N, when N is greater than M, the output voltage may be greater than the input voltage.

For example, the high current matching transformer 206 may be configured of the first winding and the second winding, and may be implemented such that an output current is greater than an input current by adjusting a winding ratio between the first winding and the second winding. Presuming that a number of the first windings is M, and a number of the second windings is N, when M is greater than N, the output current may be greater than the input current.

(2) Impedance Value Adjustment Scheme

Figure 4:
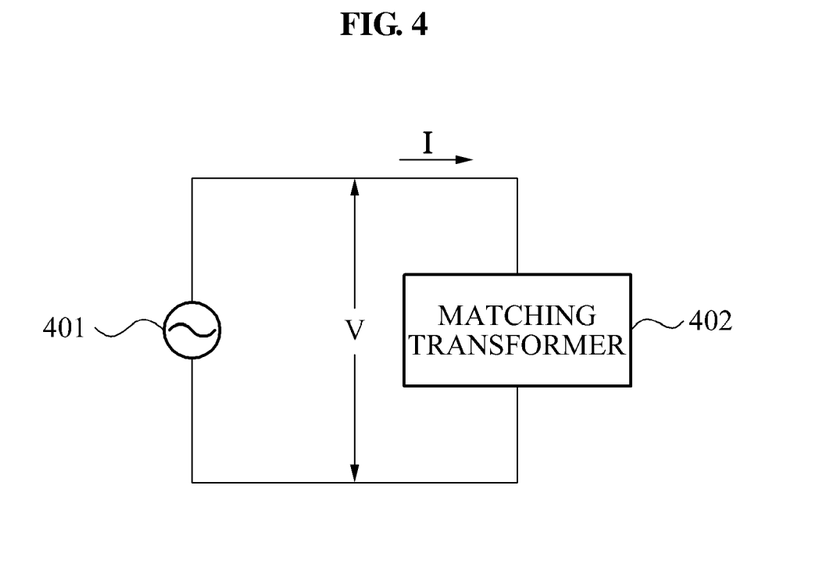
FIG. 4 is a diagram illustrating an example of a switching performed in an impedance value adjustment scheme according to an embodiment.

FIG. 4 is a diagram illustrating an example of a switching performed in an impedance value adjustment scheme according to an embodiment. Referring to FIG. 4, an impedance Z of a matching transformer 402 viewed from an AC 401 may be represented as the following Equations.

$$Z = \frac{v}{i} = j\omega L \quad \text{[Equation 1]}$$

$$i = \frac{1}{\omega L} V_p e^{j(\omega t - \pi/2)} = j\omega L \quad \text{[Equation 2]}$$

When an alternating current/voltage (I/V) is applied to the matching transformer 402, a magnetic field may be generated in an alternating voltage/current. For example, a magnetic flux may be generated due to the generated magnetic field, and when the magnetic flux is changed, a voltage/current of the matching transformer 402 may be increased. Through a control of a jωL of Equation (2), the voltage and the current may be increased. In Equation 1, w denotes a frequency of an AC signal, and L denotes an inductance of the matching transformer 402. In the above described manner, the high voltage matching transformer 205 and the high current matching transformer 206 may be designed. A power signal passing through the high voltage transformer 205 may become a high voltage power, and the high voltage power may be adopted when the target resonator (e.g., target resonator 301 in FIG. 3) is used for a battery charge. Also, a power signal passing through the high current matching transformer 206 may become a high current power, and the high current power may be adopted when the target resonator is used as a rectifier.

The power resonator 207 may transmit, to the target resonator (e.g., target resonator 301 in FIG. 3), the power signal passing through the high voltage matching transformer 205 or the high current matching transformer 206.

Figure 5:
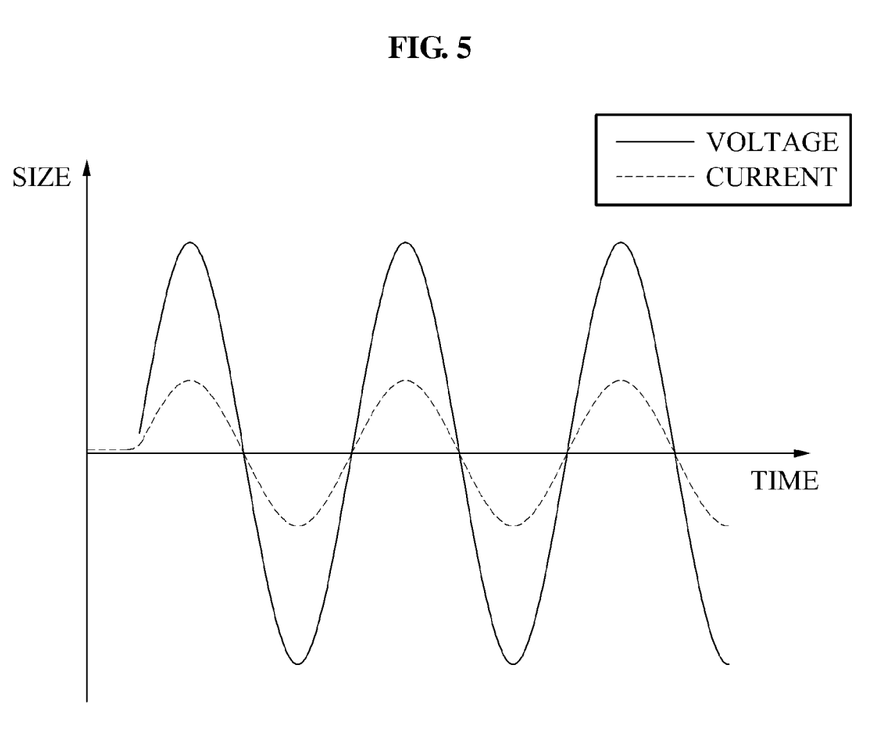
FIG. 5 is a diagram illustrating an example of an alternating current (AC) signal passing through a high voltage matching transformer according to an embodiment.

FIG. 5 is a diagram illustrating an example of an AC signal passing through a high voltage matching transformer according to an embodiment. A power may be calculated as a product of a voltage and a current, and a power signal may be converted to a signal of which a voltage is dominant, through the high voltage matching transformer.

Figure 6:
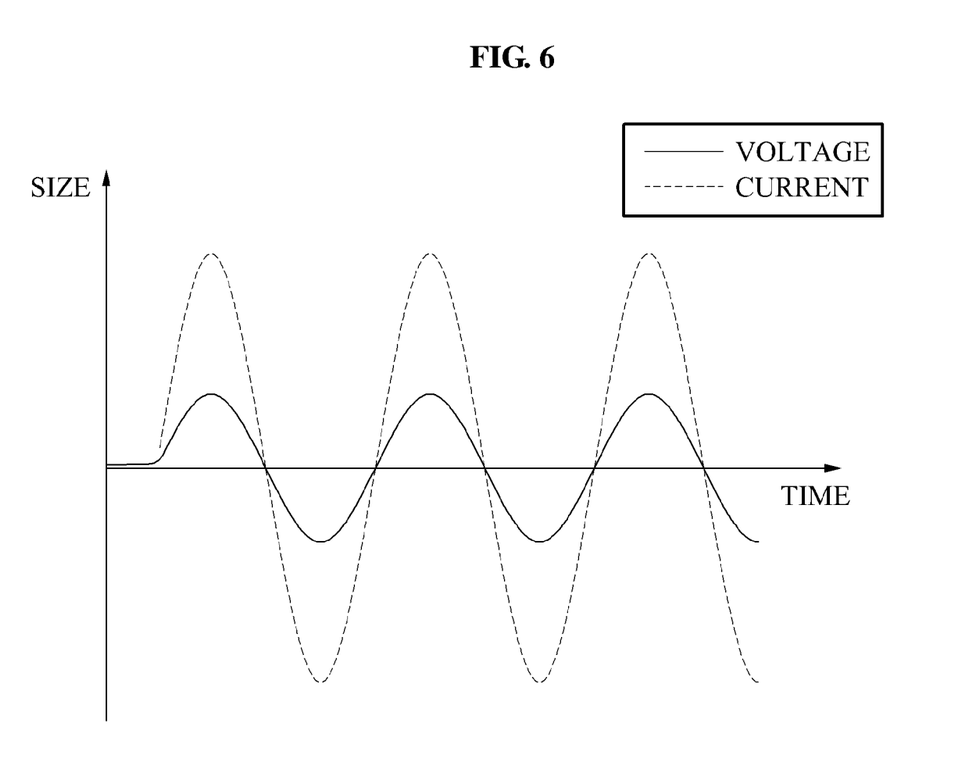
FIG. 6 is a diagram illustrating an example of an AC signal passing through a high current matching transformer according to an embodiment.

FIG. 6 is a diagram illustrating an example of an AC signal passing through a high current matching transformer according to an embodiment. A power may be calculated as a product of a voltage and a current, and a power signal may be converted to a signal of which a current is dominant, through the high current matching transformer.

According to an embodiment, there is provided a resonance power generator that may effectively control a desired output using a high voltage matching transformer and a high current matching transformer.

According to an embodiment, there is provided a resonance power generator that may switch between a high voltage power and a high current power, and transmit the switched power.

According to an embodiment, there is provided a resonance power generator that may switch between a high voltage power and a high current power depending on a type of a target resonator, and may transmit the switched power.

According to an embodiment, there is provided a resonance power generator that may reduce an insertion loss generated in an isolator itself.

According to an embodiment, there is provided a resonance power receiver that may transmit desired power information to the resonance power generator, and then receive a high voltage power or a high current power.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the devices described herein may refer to mobile devices such as a cellular phone, a personal digital assistant (PDA), a digital camera, a portable game console, and an MP3 player, a portable/personal multimedia player (PMP), a handheld e-book, a portable tablet and/or laptop PC, a global positioning system (GPS) navigation, and devices such as a desktop PC, a high definition television (HDTV), an optical disc player, a setup and/or set top box, and the like, consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A resonance power generator, comprising:
   a frequency generator configured to:
      receive a direct current (DC) voltage; and
      generate a power carrier signal;
   a high voltage matching transformer configured to be adjusted to enable an output voltage to be greater than an input voltage;
   a high current matching transformer configured to be adjusted to enable an output current to be greater than an input current;
   a switching unit configured to switch between the high voltage matching transformer and the high current matching transformer;
   a control unit configured to control the switching unit in accordance with an input signal; and
   a power resonator configured to transmit a power to a target resonator.

2. The resonance power generator of claim 1, further comprising an alternating current/direct current (AC/DC) converter configured to:
   receive an alternating current (AC) voltage; and
   convert the received AC voltage to the DC voltage.

3. The resonance power generator of claim 1, wherein the high voltage matching transformer is further configured to be adjusted to enable a winding ratio of a second winding side to be greater than a winding ratio of a first winding side.

4. The resonance power generator of claim 1, wherein the high current matching transformer is further configured to be adjusted to enable a winding ratio of a first winding side to be greater than a winding ratio of a second winding side.

5. The resonance power generator of claim 1, wherein one of the high voltage matching transformer and the high current matching transformer comprises a transformer for which a resistance value of a load of an output is adjusted.

6. The resonance power generator of claim 1, wherein the input signal comprises a user input signal.

7. The resonance power generator of claim 1, wherein the input signal comprises a signal fed back from the target resonator.

8. The resonance power generator of claim 1, further comprising a power amplifier to amplify a power of the power carrier signal.

9. A resonance power receiver, comprising:
   a target resonator configured to receive a power transmitted from a power resonator;
   a rectifier configured to rectify the power into a direct current (DC) signal;
   a sensing unit configured to:
      receive the DC signal; and
      sense a high current power and a high voltage power;
   an alternating current/direct current (AC/DC) conversion unit configured to convert each of the high current power and the high voltage power into a DC voltage; and
   a control unit configured to feed back, to the power resonator, high voltage power information or high current power information in order to control a switching unit of the power resonator to switch between a high voltage matching transformer and a high current matching transformer.

10. A method for a resonance power generator, the method comprising:
   receiving a direct current (DC) voltage;
   generating a power carrier signal;
   adjusting a high voltage matching transformer to enable an output voltage to be greater than an input voltage;
   adjusting a high current matching transformer to enable an output current to be greater than an input current;
   switching between the high voltage matching transformer and the high current matching transformer;
   controlling the switching in accordance with an input signal; and
   transmitting a power to a target resonator.

11. The method of claim 10, further comprising:
   receiving an alternating current (AC) voltage; and
   converting the received AC voltage to the DC voltage.

12. The method of claim 10, further comprising adjusting the high voltage matching transformer to enable a winding ratio of a second winding side to be greater than a winding ratio of a first winding side.

13. The method of claim 10, further comprising adjusting the high current matching transformer to enable a winding ratio of a first winding side to be greater than a winding ratio of a second winding side.

14. The method of claim 10, wherein one of the high voltage matching transformer and the high current matching transformer comprises a transformer for which a resistance value of a load of an output is adjusted.

15. The method of claim 10, wherein the input signal comprises a user input signal.

16. The method of claim 10, wherein the input signal comprises a signal fed back from the target resonator.

17. The method of claim 10, further comprising amplifying a power of the power carrier signal.

18. A method for a resonance power receiver, the method comprising:

receiving a power transmitted from a power resonator;
rectifying the power into a direct current (DC) signal;
receiving the DC signal;
sensing a high current power and a high voltage power;
converting each of the high current power and the high voltage power into a DC voltage; and
feeding back, to the power resonator, high voltage power information or high current power information in order to control a switching unit of the power resonator to switch between a high voltage matching transformer and a high current matching transformer.

\* \* \* \* \*